April 6, 1943.  E. J. MARTIN ET AL  2,316,009
BAROMETRIC DEVICE
Filed Aug. 25, 1941
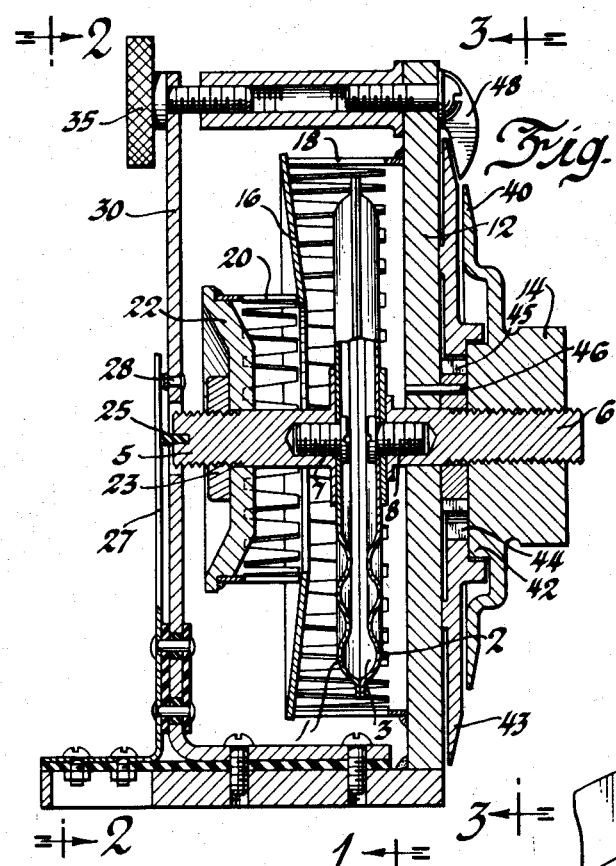
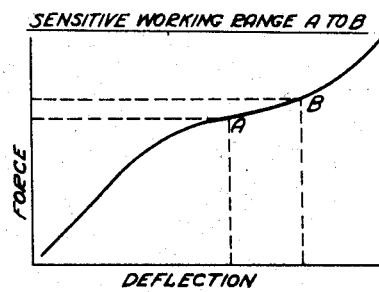
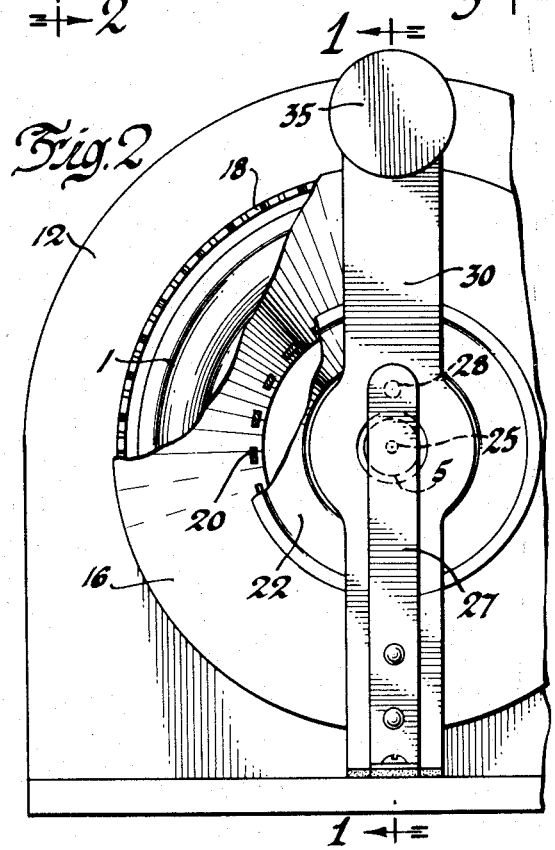
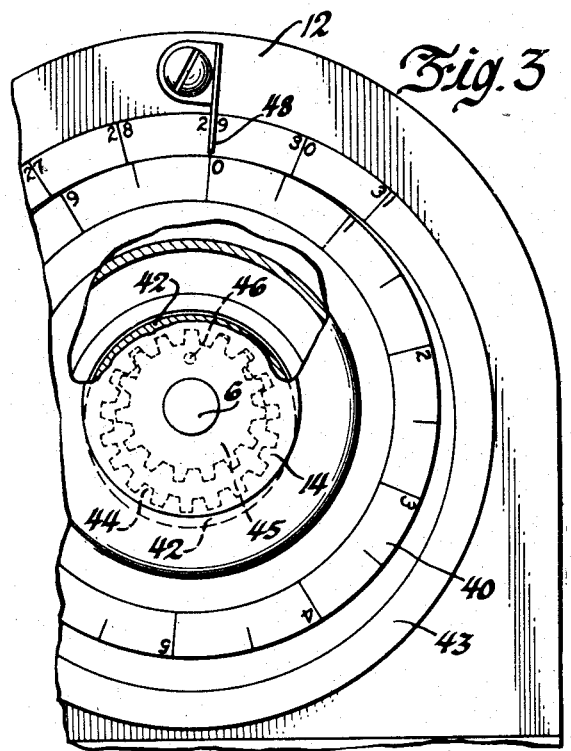
Inventors
Edward J. Martin &
Robert H. Dietz
By Blackmore, Spencer & Flint
Attorneys Patented Apr. 6, 1943

2,316,009

UNITED STATES PATENT OFFICE 2,316,009

BAROMETRIC DEVICE

Edward J. Martin, Pleasant Ridge, and Robert H. Dietz, Birmingham, Mich., assignors to General Motors Corporation, Detroit, Mich., a corporation of Delaware Application August 25, 1941, Serial No. 408,164

6 Claims. (Cl. 137—156)

This invention relates to aneroid barometers, and especially to such barometers which are used to control a mechanism in response to a change in atmospheric pressure.

More specifically, it relates to aneroid barometers which are used for automatic altitude control of aircraft.

In order to conserve space and to minimize the effects of vibration in a portable aneroid barometer, it is customary to oppose the load of atmospheric pressure on the aneroid cell by a small leaf spring which must be very stiff to support a load of about fifty pounds to which it is subjected by the atmospheric pressure. Movement of the spring or other pressure responsive parts is exceedingly small for small altitude changes of say twenty feet, and for this reason such a barometer is insufficiently sensitive for use as an altitude control element for aircraft.

The object of the invention is an aneroid barometer device which is of strong and rugged construction and very sensitive within a limited range of atmospheric pressure.

A further object of the invention is an aneroid barometer device which is very sensitive within a part of its operating range and which may be adjusted so that it operates within the sensitive part of its operating range between any desired small limits of atmospheric pressure change.

The above and other objects of the invention will be apparent as the description proceeds.

According to the invention, the load of atmospheric pressure on an aneroid cell is opposed by a varying rate spring having a sinuous force/deflection curve, with a low rate portion in which there is considerable deflection of the spring for a small change in force thereon, in a part of its operating range. Springs with such characteristics may be made in various forms as shown for example in U. S. Patents 2,045,557 and 2,238,380. A convenient form for the present application is a dished sheet steel spring of the so-called Belleville washer type similar to that shown in U. S. Patent 2,045,557 but so proportioned as to have the requisite low rate rather than a zero rate in a part of its operating range.

The drawing shows one construction of a barometric device according to the invention.

In the drawing:

Figure 1 is a sectional view on line 1—1 of Figure 2.

Figure 2 is a view on line 2—2 of Figure 1 with part broken away.

Figure 3 is a view on line 3—3 of Figure 1 with part broken away.

Figure 4 is a torque deflection curve of a suitable spring means for the device.

The aneroid cell consists of two diaphragms 1 and 2 which are circumferentially corrugated for flexibility, and enclose between them a sealed space 3.

The diaphragms 1 and 2 are provided at their centers with outwardly projecting screw threaded stems 5 and 6 respectively, secured to the diaphragms by screws 7 and 8.

The stem 6 is supported in a frame 12 in which it is axially adjustable by a knob 14 which constitutes a nut on the stem 6. Between the frame 12 and the stem 5 is a varying rate spring 16 which resiliently urges the stem 5, and with it the diaphragm side 1 of the aneroid cell, away from the diaphragm side 2 thereof.

The varying rate spring 16 is a dished sheet steel spring of the so-called Belleville washer type, with a sinuous force/deflection curve having the requisite low rate in a part of its operating range. The outer periphery of the Belleville washer spring 16 is supported from the frame 12 by a ring of flexible fingers 18. It resiliently urges the stem 5 in the required direction through a ring of flexible fingers 20 which are secured to an abutment collar 22 on the stem 5 and engage the inner circumference of the Belleville washer. The position of the abutment collar 22 on the stem 5 is adjustable by means of a nut 23 thereon.

It will be appreciated that the inner and outer peripheries of the Belleville washer expand or contract with deflection and the flexible fingers 18 and 20 permit of this without friction.

A change in atmospheric pressure causes expansion or contraction of the aneroid cell and axial movement of the stem 5 which has a tip 25 of insulating material adapted to make or break electrical contact between a flexible arm 27 and a contact point 28 on an arm 30 otherwise insulated from the arm 27 in an electrical circuit (not shown).

Bending deflection of the arm 30 to adjust the position of the contact point 28 can be effected by means of a screw 35.

The knob 14 is provided with a vernier dial 40 and has an eccentric boss 42 which forms a bearing for a dial 43 having an internally toothed portion 44 which engages with a stationary gear wheel 45 concentric with the stem 6 and secured to the frame 12 by a pin 46.

The dial 43 is graduated in units of pressure, which, as shown, are inches of a column of mercury which given atmospheric pressures will support, and the dial 40 is graduated in fractions thereof; the ratio of the gearing being such that for one complete turn of the dial 40, the dial 43 moves through only a small part of a turn corresponding to one inch of mercury on its scale.

The Belleville washer 16 has a sinuous force deflection curve of the kind shown in Figure 4, having a low rate portion A—B of its range in which there is a relatively large deflection for a small change of force on the spring.

It will be seen that the pressure of the spring 16 resiliently urges the two sides of the aneroid cell away from each other in opposition to atmospheric pressure on the aneroid cell. The pressure of the spring 16 may be adjusted either by the knob 14 on the stem 6, or the nut 23 on the stem 5. When this pressure is so adjusted that it is within the range A—B on the curve of Figure 4, with a given atmospheric pressure on the aneroid cell, there will be a relatively large deflection of the spring for a small change in atmospheric pressure away therefrom. If, with the dials 43 and 40 set at the given atmospheric pressure opposite a pointer 48 secured to the frame 12, the spring force is adjusted by the nut 23 to be within the range A—B of Figure 4 at that pressure, then the spring can be adjusted to be within that range at any other desired atmospheric pressure by turning of the knob 14 to the required position indicated on the dials.

The arm 30 being deflected by the screw 35 to a position of adjustment in which the point 28 thereon just makes contact with the resilient arm 27 with the latter against the insulated tip 25 of the stem 5, a reduction in atmospheric pressure will cause breaking of an electrical circuit through the arms 27 and 30, by movement of the stem 5 to the left as shown in Figure 1. Sufficient subsequent increase in atmospheric pressure will re-establish the electrical circuit by movement of the stem 5 to the right.

Obviously, the device may be mounted on an aircraft and adjusted so that when the aircraft reaches a desired altitude of flight, the force on the aneroid cell and thus on the varying rate spring will be in the working range A—B shown on the curve Figure 4. In this region a small change in altitude with a correspondingly small change in force on the aneroid cell will give a relatively large deflection of the spring and movement of the stem 5, which by making or breaking an electric circuit through the arms 27 and 30 may be arranged automatically to control suitable servo devices for maintaining the aircraft at the desired flight altitude.

We claim:
1. A barometric device to control a mechanism in response to a change in atmospheric pressure, including an aneroid cell, and a varying rate spring resiliently opposing the load of atmospheric pressure on the cell; said spring having a sinuous force/deflection curve with a low rate in a part of its operating range, whereby the device has increased sensitivity to changes in atmospheric pressure in a limited part of its working range.

2. The combination according to claim 1 in which the pressure of the varying rate spring opposing the load on the cell is adjustable so that within any desired limited range of atmospheric pressure change it is operative within the low range portion of its force/deflection curve, to give the device increased sensitivity in that range.

3. The combination according to claim 1 in which the varying rate spring is a Belleville washer.

4. In combination, an aneroid cell, a supporting frame therefor, said aneroid cell consisting of two diaphragms enclosing a sealed space between them and provided at their center with outwardly projecting screw threaded stems; a nut on one of said stems for holding one of said diaphragms with its stem in any desired position of axial adjustment in the supporting frame, and a Belleville washer spring between the frame and the other of said stems resiliently opposing the load of atmospheric pressure on said cell.

5. The combination according to claim 4 in which the Belleville washer between the frame and the other of said stems has its outer periphery supported from the frame by a ring of flexible fingers and thrusts on the said stem through another ring of flexible fingers between the inner circumference of said Belleville washer and an abutment adjustable on said stem.

6. The combination according to claim 4 in which the nut constitutes the knob of a vernier dial having an eccentric boss forming a bearing for a dial graduated in units of atmospheric pressure and having an internally toothed portion engaging a stationary gear wheel, the ratio of the gearing being such that for one complete turn of the vernier dial the other dial moves through only a part of a turn corresponding to one unit of pressure on its scale.

EDWARD J. MARTIN.
ROBERT H. DIETZ.